United States Patent
Marupaduga et al.

(10) Patent No.: US 10,785,695 B1
(45) Date of Patent: Sep. 22, 2020

(54) SYSTEM AND METHOD FOR MANAGING DATA THROUGHPUT OF WIRELESS DEVICES IN A WIRELESS NETWORK

(71) Applicant: Sprint Spectrum LP, Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/279,178

(22) Filed: Feb. 19, 2019

(51) Int. Cl.
| | |
|---|---|
| H04W 4/00 | (2018.01) |
| H04W 36/30 | (2009.01) |
| H04B 7/0452 | (2017.01) |
| H04W 36/00 | (2009.01) |
| H04W 36/06 | (2009.01) |
| H04B 7/06 | (2006.01) |
| H04W 80/02 | (2009.01) |
| H04W 28/22 | (2009.01) |
| H04W 36/16 | (2009.01) |

(52) U.S. Cl.
CPC .......... *H04W 36/30* (2013.01); *H04B 7/0452* (2013.01); *H04B 7/061* (2013.01); *H04B 7/0617* (2013.01); *H04B 7/0632* (2013.01); *H04W 28/22* (2013.01); *H04W 36/0069* (2018.08); *H04W 36/0094* (2013.01); *H04W 36/06* (2013.01); *H04W 36/165* (2013.01); *H04W 80/02* (2013.01)

(58) Field of Classification Search
CPC ..... H04W 36/08; H04W 36/14; H04W 84/12; H04W 36/0055; H04W 36/30
See application file for complete search history.

(56) References Cited

U.S. PATENT DOCUMENTS

| | | | |
|---|---|---|---|
| 10,084,522 B2 | 9/2018 | Zhang et al. | |
| 2005/0143084 A1* | 6/2005 | Cheng | H04L 1/0028 455/452.2 |
| 2007/0243877 A1* | 10/2007 | Elmaleh | H04W 16/00 455/450 |
| 2008/0062062 A1* | 3/2008 | Borau | H01Q 21/065 343/844 |
| 2011/0150052 A1* | 6/2011 | Erell | H04B 7/063 375/219 |
| 2014/0211685 A1* | 7/2014 | Kim | H04W 36/06 370/312 |

(Continued)

*Primary Examiner* — Atique Ahmed

(57) ABSTRACT

Systems, methods, and processing nodes are configured to manage data throughput of wireless devices in a wireless network, such as a network that employs MIMO techniques, by receiving a request from a wireless device to operate in the wireless network using a first communication protocol, the wireless network deploying communications with wireless devices using at least two communication protocols simultaneously determining that a value associated with data rate used by a set of wireless devices in the wireless network using at least one of the at least two communication protocols exceeds a threshold value, and adjusting an operating parameter of a multi-element antenna for communicating signals between an access node and the plurality of wireless devices in the wireless network using the first communication protocol when it is determined that the value exceed the threshold value.

19 Claims, 8 Drawing Sheets

(56) References Cited

U.S. PATENT DOCUMENTS

| | | | |
|---|---|---|---|
| 2014/0321376 A1* | 10/2014 | Damnjanovic ... | H04W 72/1215 370/329 |
| 2015/0296499 A1* | 10/2015 | Huang ............... | H04W 72/048 370/329 |
| 2016/0073265 A1* | 3/2016 | Vutukuri ............. | H04W 12/06 455/411 |
| 2016/0164593 A1 | 6/2016 | Lee et al. | |
| 2016/0329941 A1* | 11/2016 | Bengtsson ........... | H04B 17/318 |
| 2017/0005712 A1* | 1/2017 | Jiang .................. | H04B 7/0413 |
| 2017/0208488 A1* | 7/2017 | Hwang ................ | H04W 76/34 |
| 2017/0215065 A1* | 7/2017 | Vamanan ............. | H04W 8/24 |
| 2017/0295606 A1* | 10/2017 | Kahn .................. | H04W 72/0406 |
| 2019/0045577 A1* | 2/2019 | Kim .................... | H04W 4/90 |
| 2019/0069229 A1* | 2/2019 | Lee ..................... | H04W 48/18 |
| 2019/0149200 A1* | 5/2019 | Kwok .................. | H04B 7/0417 375/267 |
| 2019/0215740 A1* | 7/2019 | Wu ...................... | H04W 76/15 |

* cited by examiner

SYSTEM AND METHOD FOR MANAGING DATA THROUGHPUT OF WIRELESS DEVICES IN A WIRELESS NETWORK

TECHNICAL BACKGROUND

As wireless networks evolve and grow, there are ongoing challenges in communicating data across different types of networks. For example, a wireless network may include one or more access nodes, such as base stations, for providing wireless voice and data service to wireless devices in various coverage areas of the one or more access nodes. Wireless networks may be configured to utilize a single-user multiple-in multiple-out (SU-MIMO) operating mode and/or a multi-user (MU-MIMO) mode. In the SU-MIMO operating mode, multiple data streams are directed towards individual wireless devices. In the MU-MIMO operating mode, the multiple data streams can be directed towards plural wireless devices that are selected to participate in the MU-MIMO operating mode based on the orthogonality of transmission, thereby maximizing resources. In a recent evolution of MIMO technology, known as massive MIMO or large-scale MIMO, an access node may utilize hundreds of antennae to simultaneously transmit each of a plurality of different data streams to a corresponding plurality of wireless devices. Massive MIMO has been identified as one of the promising air interface technologies to address the massive data rate or throughput capacity requirement demanded by wireless devices that operate using new communication protocols including, but not limited to, a Fifth Generation mobile networks or wireless systems (5G) protocol.

However, coupling the high performance capabilities of newer communication protocols with MIMO systems, such as SU-MIMO, MU-MIMO, and massive MIMO using any form of MIMO in a wireless network may create problems. For instance, when a wireless device requests access to the wireless network using the newer communication protocol, the addition data throughput may potentially create an unmanageable data throughput load in either the uplink or downlink data path for signals being delivered to one or more of the other wireless devices already in the wireless network using the newer communication protocol. In order to manage the increased data throughput load, some rebalancing of data throughput partitioning between some or all of the wireless devices will be necessary. The rebalancing may limit the performance, such as quality of service (QoS) or packet loss rate, of one or more services provided to some or all of the wireless devices already currently on the network, particularly if these devices are using services that work best using the newer, higher performance communication protocols. Thus, there is a need to identify and manage data throughput of wireless devices in a wireless network when wireless devices are simultaneously utilizing the high performance operating characteristics of new communication protocols with MIMO in the wireless network.

OVERVIEW

Exemplary embodiments described herein include methods, systems, and processing nodes for managing wireless devices in a wireless network. An exemplary method includes receiving a request from a wireless device to operate in the wireless network using a first communication protocol, the wireless network deploying communications with wireless devices using at least two communication protocols simultaneously, determining that a value associated with data rate used by a set of wireless devices in the wireless network using at least one of the at least two communication protocols exceeds a threshold value, and adjusting an operating parameter of a multi-element antenna for communicating signals between an access node and the plurality of wireless devices in the wireless network using the first communication protocol when it is determined that the value exceed the threshold value.

An exemplary system includes an access node, the access node including one or more multi-element antennas for communicating in a wireless network using at least two communication protocols, and a processing node coupled to the access node, the processing node receiving a request from a wireless device to operate in the wireless network using a first protocol of the at least two communication protocols, determining whether allowing the requesting wireless device to operate in the wireless network using the first communication protocol causes a value associated with data rate for a set of wireless devices in the wireless network using the first communication protocol to exceed a threshold value, and providing instructions to the access node to adjust an operating parameter of a multi-element antenna for communicating signals between the access node and a plurality of wireless devices in the wireless network using the first communication protocol when the value associated with data rate for a set of wireless devices in the wireless network using the first communication protocol exceeds the threshold value.

An exemplary processing node includes a processor configured to receive a request from a wireless device for access to a wireless network communicating through an access node using a first communication protocol, the wireless network using at least two communication protocols simultaneously, determine that a value associated with data throughput for a set of wireless devices in the network using the first communication protocol exceeds a threshold value, and provide instructions for adjusting an operating parameter of an antenna array in a access node for communicating signals in the wireless network using the first communication protocol when it is determined that the value associated with data throughput for the set of wireless devices exceeds the threshold value.

The above presents a simplified overview of the subject matter in order to provide a basic understanding of some aspects of subject matter embodiments. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
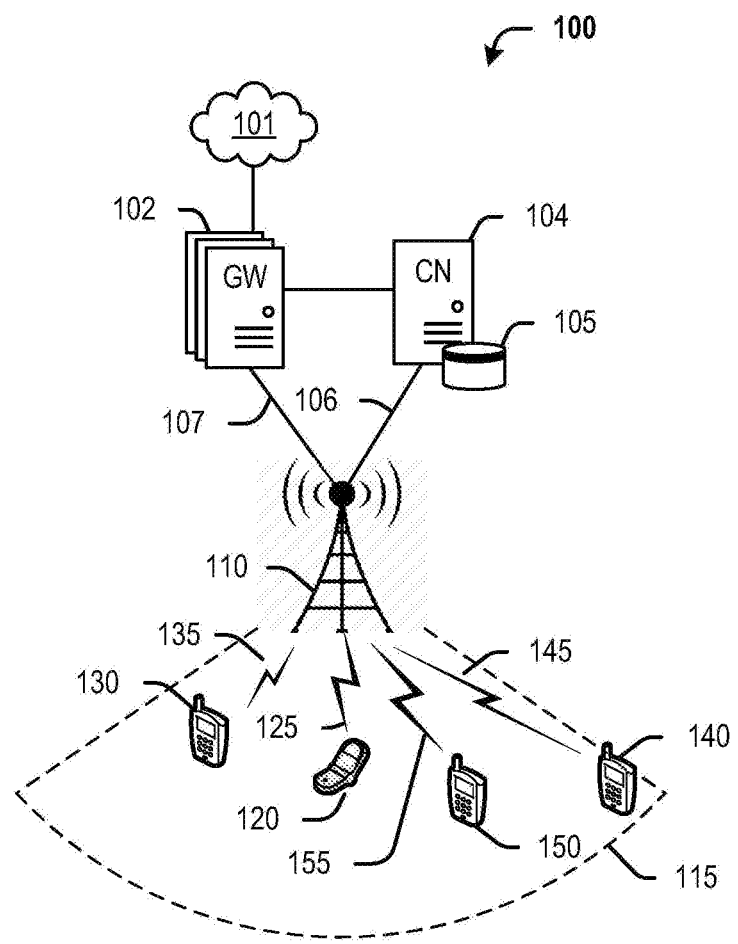
FIG. 1 depicts an exemplary system for managing wireless devices in wireless networks, such as networks configured to utilize MIMO.

It should be understood that the drawing(s) are for purposes of illustrating the concepts of the disclosure and are not necessarily the only possible configuration for illustrating the disclosure.

DETAILED DESCRIPTION

In some of the embodiments disclosed herein, a method or process is described that utilizes a mechanism or process for managing data throughput of wireless devices in a wireless network. The process includes receiving a request from a wireless device to operate in the wireless network using a first communication protocol, the wireless network including an access node for communicating with wireless devices using at least two communication protocols simultaneously. The process further determines whether a value associated with data rate used by a set of wireless devices in the wireless network using one or more of the at least two communication protocols exceeds a threshold value and adjusts an operating parameter of an antenna included in the access node, such as a multi-element antenna or antenna array, when it is determined that the value exceed the threshold value.

In some embodiments, the multi-element antenna or antenna can be configured to operate in one of several MIMO operating modes in the wireless network including, but not limited to, SU-MIMO, MU-MIMO, and massive MIMO using any form of MIMO. Further, in some embodiments the multi-element antenna or antenna array includes a first portion or section having a first set or subset that with a first number of elements used for communicating in the wireless network using a first communication protocol. For example, the first communication may be a 5G protocol. It is important to note that, in some instances, the first set of elements constitute all the elements of the multi-element antenna. Further, the multi-element antenna may be one of a set of multi-element antennas, each one of the set covering a radial sector outward from a fixed location (e.g., a communication tower that includes a communication system).

In some embodiments, the one or more communication protocol of the at least two communication protocols used for determining the value associated with the set of wireless devices in the wireless network may include the first communication protocol. Further, in some embodiments, the one or more communication protocol for determining the value may include all of the at least two communication protocols. Additionally, in some embodiments, the set of wireless devices used in determining the value may include all wireless devices in the wireless network using any of the at least two communication protocols.

Further, in some embodiments, the multi-element antenna further includes another or second portion or section having a second set or subset of elements with a second number of elements. The elements in the second set of elements are different from the elements in the first set of elements. The second set of elements is used for communication on the same wireless network as the first set of elements but use a second communication protocol that is different from the first communication protocol. The second protocol may be a more commonly used and/or older generation protocol, a protocol using simpler operating parameters, or a protocol with lower performance than the first communication protocol. For example, this second communication protocol may be a Fourth Generation broadband cellular (4G) protocol.

In some embodiments, prior to any adjustment as described above, the number of elements in the first set of elements and the number of elements in the second set of elements of the multi-element antenna or antenna array is the same. For example, the number of elements in each set may be 32.

In some embodiments, all or a portion of multi-element antenna is adjusted by reducing the first number of elements used for transmitting a signal, receiving a signal, or both transmitting and receiving a signal within the wireless network using the first protocol mentioned above. Further, in some embodiments, the first number of elements in the first set of elements is reduced by a factor that is a multiple of two. For example, initially and prior to any adjustment as described above, the multi-element antenna includes a total of 64 elements, the number of elements in the first set and operated with a first communication protocol is 32, and the number of elements in the second set and operated with the second communication protocol is 32 elements, the remaining 32 elements. Following the adjustment as described above, the number of elements that remain operational (i.e., used for transmitting and/or receiving) in the first set of elements with the first communication protocol may be 16 or any other factor of two of the original 32 elements. The remaining 16 or other number of elements from the first set are not operational (i.e., not used for transmitting and/or receiving). A different reduction in number of elements is possible and the reduction may be performed in more than one step based on desired characteristics for the operation parameters of the multi-element antenna.

In some embodiments, the adjusting of all or a portion of the multi-element antenna includes reducing the number of elements used for transmitting a communication signal while not reducing the number elements used for receiving a communication signal. For instance, as a result of adjusting the multi-element antenna, 16 antenna elements of the original 32 elements in the first set of elements remain operational for transmitting communication signals while all 32 elements of the first set of elements are still operational for receiving communication signals using the first communication protocol (e.g., 5G). Further in some embodiments, the opposite adjustment may be performed, reducing the number of elements used for receiving a communication signal and not reducing the number of elements used for transmitting a communication signal. In either case, the number of elements used for transmitting a communication signal is different from the number of elements used for receiving a communication signal.

In some embodiments, the determining the value associated with data rate used by set of wireless devices may include calculating or measuring a bit rate or any value associated with bit rate, including the bit rate for the radio downlink, also known as the forward link, from the access node to the wireless devices. In other embodiments, the determining the value associated with the data rate may include the calculating or measuring bit rate or any value associated with bit rate for the radio uplink, also known as the reverse link, from the wireless devices to the access node or may include any combination of values associated with bit rates for the radio downlink and radio uplink. In still other embodiments, the value associated with the data rate may include the bit rate or a value associated with the bit rate for the backhaul portion of the network, typically referring to the communication between a communication network and the access node.

In some embodiments the determining the value associated with data rate used by the set of wireless devices in the wireless network using the first communication protocol may include determining an aggregate data rate for all of the wireless devices on the wireless network using the first communication protocol.

In some embodiments, a segmentation of the sector, or cell, for the wireless network that is serviced by the access node and multi-element antenna into two or more regions may be performed. For instance, a first region may be defined as a cell center region that includes any wireless device operating within a specified distance from the access node and multi-element antenna or communication tower. A second region may be defined as a cell edge region that includes any wireless device operating outside the specified distance for the cell center region. The set of wireless devices used for determining the value may include wireless devices in either the cell center or the cell edge. Alternatively, the set of wireless devices used for determining the value may include wireless devices for both the cell center and cell edge and may be partitioned in terms of a percentage of wireless devices from each of the regions. It is important to note that more than two regions may be identified and one or more of the values may be measured and/or calculated for the set of wireless devices based on the region as part of determining if the value exceed the threshold value.

In some embodiments, determining the value associated with data rate used by the set of wireless devices on the wireless network using the first communication protocol may further include determining that value over a period of time. For example, physical resource block utilization for all the wireless devices serviced by an access node in the wireless network may be measured as part of a radio resource control function in a sector over a 24 hour period of time. The maximum value in that period of time is selected as the value associated with data rate. In another example, the bit rate used for all wireless devices in the wireless network serviced by an access node in a sector or cell using a 5G communication protocol is measured over a rolling four hour period of time. An average value for bit rate used for any four hour period is calculated and used as the value associated with bit rate. It is important to note that other possible values may be measured and computed over time as are well known to one skilled in the art.

As an additional mechanism, some form of statistical analysis may be incorporated with the determination of the value associated with the set of wireless devices in the wireless network. The statistical analysis may further include using numbers or values for data rates, bit rates, packet rates, loading, or throughput that are taken over a period of time. For example, a value may be determined for a peak throughput load based on using statistical analysis of throughput data taken over the previous hours of time for the set of wireless devices in the wireless network. Any or all of these values or numbers based on statistical analysis may be provided and/or used in calculating the value associated with data rate and used for determining if the value exceeds the threshold value. It is important to note that other possible values may be computed or calculated using statistical analysis as are well known to one skilled in the art.

In some embodiments, the wireless device may initially request access to the wireless network using the second communication protocol describe earlier before requesting access using the first communication protocol. For instance, in order for a wireless device to join the wireless network, the wireless device goes through an initialization procedure for verification or authentication. The wireless device joins the network using a second, reduced performance, or older version communication protocol (e.g., 4G) to establish signaling protocols between the access node or communication tower and the new wireless device. Further, the wireless device may remain operational for one or more services (e.g., telephone service) using this second communication protocol even after joining the wireless network using the first communication protocol. Such a configuration may be known as a dual-connect configuration and may use the first communication protocol (e.g., 5G) for higher performance services, such as high definition video streaming services.

In some embodiments, the request for access to the wireless network using the first communication protocol by the wireless device may be initially denied when it is determined that when it is determined that the value associated with data rate for the set of wireless devices in the wireless network exceeds the threshold value. The request may be initially denied in order to permit any adjustment of the operating parameter of the multi-element antenna to take effect in the deployment and configuration of the wireless network.

In some embodiments, the adjustment to the operating parameter of the multi-element antenna when it is determined that the value associated with data rate used by the set of wireless devices in the wireless network exceeds a threshold value may force at least one of the plurality of wireless devices currently in the wireless network and using the first communication protocol to cease operating in the wireless network using the first communication protocol. These devices may send a request to operate in, or remain operating in, the wireless network using another or second communication protocol if these devices are not already operating in dual-connect mode. One or more wireless devices, particularly those devices that are located near the cell edge for the wireless network serviced the access node or communication tower, may send a request for handover to join a different cell of the wireless network serviced by a different access node or communication tower.

In some embodiments, the wireless device requesting to operate using the first communication protocol may be forced to request to operate in, or remain operating in, the wireless network using another communication protocol or may request a handover to a different cell in the wireless network as described above, depending in the location of the new wireless device and its proximity to the cell edge or the cell center of the cell currently being serviced by the access node or communication tower. Such a condition may occur if, for instance, none of the wireless devices currently in the wireless network using the first communication protocol cease using the first communication protocol.

In some embodiments, the request made by the wireless device to operate in the wireless network using the first communication protocol may be accepted at least one of the plurality of wireless devices ceases operating in the wireless network using the first communication protocol and the value associated with data rate for the set of wireless devices no longer exceeds the threshold value.

In some embodiments, the request may be received from a wireless device that has recently entered the area serviced by the wireless network. The requesting wireless device may have services already in use and may have been connected to the wireless network in another sector serviced by a different access node using the first communication protocol. Alternatively, the request may be received from a wireless device that has recently been powered on or is requesting to establish a new service (e.g., high definition video streaming service) requested by the user of the wireless device and requiring operation in the wireless network using the first communication protocol.

In some embodiments described herein, a system is used to perform one or more of the aspects of present disclosure described by the various embodiments herein. The system includes an access node, the access node including one or more multi-element antennas for communicating in a wireless network using at least two communication protocols. The system further includes a processing node coupled to the access node, the processing node receiving a request from a wireless device to operate in the wireless network using a first protocol of the at least two communication protocols, determining whether allowing the requesting wireless device to operate in the wireless network using the first communication protocol causes a value associated with data rate for a set of wireless devices in the wireless network using the first communication protocol to exceed a threshold value, and providing instructions to the access node to adjust an operating parameter of a multi-element antenna for communicating signals between the access node and a plurality of wireless devices in the wireless network using the first communication protocol when the value associated with data rate for a set of wireless devices in the wireless network using the first communication protocol exceeds the threshold value. The access node may include additional electrical elements used in conjunction with general wireless communication technology as well as specific electrical elements necessary for operation in specific types of wireless communication networks. The processing node further may include one or more processors as well as other elements necessary to perform the operations as described above.

In some embodiments described herein, a processing node may be included to perform one or more of the aspects of the disclosure described by the various embodiments herein. The processing node includes one or more processors configured to receive a request from a wireless device for access to a wireless network communicating through an access node using a first communication protocol, the wireless network using at least two communication protocols simultaneously, determine that a value associated with data throughput for a set of wireless devices in the wireless network using the first communication protocol exceeds a threshold value, and provide instructions for adjusting an operating parameter of an antenna array in a access node for communicating signals in the wireless network using the first communication protocol when it is determined that the value associated with data throughput for the set of wireless devices exceeds the threshold value. The processing node may include additional elements, including but not limited to, a data storage element, and a memory for storing program instructions. The memory or similar element may provide the program instructions to the one or more processors in order to execute the various mechanisms in the embodiments described herein.

The implementation of one or more of the aspects of the processes, mechanisms, systems, and devices for managing data throughput of wireless devices in a wireless network as described in the present disclosure may be configured to mitigate or eliminate the impact of adding wireless devices to the wireless network, when these added devices request to join using a high performance communication protocol, such as 5G. The implementation of one or more aspects described herein may assure that users of the wireless devices currently on the wireless network do not perceive a degradation of performance of one or more of the services currently needed by those users of the wireless device and that may require the use of the higher performance communication protocol provided over the wireless network. The performance degradation may be characterized in the wireless network through several metrics including, but not limited to, such as in terms of quality of service (QOS), latency of delivery, delay jitter, packet loss rate and buffering delay.

These and additional operations are further described with respect to the embodiments depicted in FIGS. 1-8 below.

FIG. 1 depicts an exemplary system 100 for managing wireless devices in wireless networks, including wireless networks configured to utilize MIMO operation (e.g., SU-MIMO, MU-MIMO, and massive MIMO using any form of MIMO). System 100 comprises a communication network 101, gateway node(s) 102, controller node 104, access node 110, wireless devices 120, 130, 140, and a new or additional wireless device 150. Access node 110 is illustrated as deploying a cell or sector 115, with wireless devices 120, 130, 140 and new or additional wireless device 150 being located within sector 115 and accessing network services from a service provider using access node 110. Access node 110 can be any network node configured to provide communication between end-user wireless devices 120, 130, 140, as well as new or additional wireless device 150, and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNB) in 5G networks, or the like. In other embodiments, access node 110 can be a small access node including a microcell access node, a picocell access node, a femtocell access node, or the like such as a home NodeB device or a home eNodeB device. It is also noted that access node 110 is illustrated as incorporated as part of a communication tower. However, access node 110 may be incorporated in any number of structures including, but not limited to, a residential or commercial dwelling, a utility pole, a bridge, and the like.

By virtue of comprising a plurality of antennae configured as a multi-element antenna or an antenna array as further described herein, access node 110 may deploy or implement multiple-input-multiple-output (MIMO) modes, such as SU-MIMO or MU-MIMO modes as well as similar massive MIMO modes. In an embodiment, access node 110 may utilize hundreds of antennae to simultaneously transmit each of a plurality of different data streams using the same or different communication protocols, including MIMO data streams 125, 135, and 145, to a corresponding plurality of wireless devices (such as wireless devices 120, 130, and 140 respectively). Further, it is noted that while three MIMO data streams are disclosed in sector 115, a larger or smaller number of wireless devices and MIMO data streams within sector 115 can be implemented depending on the configuration of access node 110. Moreover, it is noted that while one access node 110 is illustrated in FIG. 1, any number of access nodes can be implemented within system 100.

The plurality of antennae that make up the multi-element antenna or antenna array also transmit and receive data streams, including MIMO data streams, (125, 135, 145) for the corresponding plurality of wireless devices (120, 130, 140). These data streams may include one or more of the services provided over the wireless network including, but not limited, to phone service, internet service, audio streaming service, and video streaming service. In addition, the plurality of antennae may receive a signal 155 transmitted from new or additional wireless device 150 within the range of distance covered by sector 115. Signal 155 may initially be a signal that includes a request to join the wireless network in order to use one or more of the services provided over the wireless network.

In operation, system 100, using one or more of the elements described herein, receives a request, as part of signal 155, from a wireless device to operate in the wireless network serviced by a multi-element antenna in access node 110. The request may include a request to operate using one of the communication protocols in the wireless network, the wireless network supporting operation, through access node 110, of at least two communication protocols simultaneously. System 100 further determines whether allowing the requesting wireless device to operate in the wireless network using the first communication protocol causes a value associated with data rate for a set of wireless devices (e.g., wireless devices 120, 130, 140) in the wireless network using the first communication protocol to exceed a threshold value and adjusts an operating parameter of the multi-element antenna for communicating signals between access node 110 and the set of wireless devices (e.g., wireless devices 120, 130, 140) in the wireless network using the first communication protocol when it is determined that the value associated with data rate for a set of wireless devices in the wireless network using the first communication protocol exceeds the threshold value. The threshold value used as part of the determination may be a maximum data rate for the set of wireless devices. Alternatively, the threshold value may be a lower value than the maximum data rate or may be a percentage of the maximum data rate, such as 90 percent of the maximum data rate for the set of wireless devices. Other threshold values may also be used.

In some embodiments, wireless device 150 may have recently entered the area of the wireless network serviced by sector 115 and access node 110. Wireless device 150 may have services already in use and may have been connected to a different wireless network serviced by a different access node using the first communication protocol. Alternatively, wireless device 150 may have recently been powered on or is requesting to establish a new service (e.g., high definition video streaming service) that needs to use the first communication protocol in the wireless network based on inputs from the user of wireless device 150.

In some embodiments, the multi-element antenna in access node 110 may include a first set or subset of elements used for communicating in the wireless network using the first communication protocol. For example, the first communication protocol may be a 5G protocol. The first set of elements may constitute all or a portion of the elements of the multi-element antenna in access node 110.

In some embodiments, the multi-element antenna in access node 110 may further include another portion or section that has a second set or subset of elements that are different from the first set or subset of elements. The second set or subset of elements are used for communication in the wireless network using a second communication protocol. In some instances, the second communication protocol may be a commonly used and/or older generation protocol, a protocol using simpler operating parameters, or a protocol with lower performance than the first communication protocol. For example, this second communication protocol may be a 4G protocol.

In some embodiments, the wireless device 150 may initially request access to the wireless network using the second communication protocol described earlier before requesting access using the first communication protocol. For instance, wireless device 150 goes through an initialization procedure for verification or authentication as part of initially joining the wireless network. Wireless device 150 joins the network using a second communication protocol (e.g., 4G) to establish signaling protocols between the access node or communication tower and the new wireless device. Further, wireless device 150 may remain operational for one or more services (e.g., telephone service) using this second communication protocol even after joining the wireless network using the first communication protocol. Such a configuration may be known as a dual-connect configuration and may use the first communication protocol (e.g., 5G) for higher performance services, such as high definition video streaming services.

In some embodiments, all or a portion of the multi-element antenna in access node 110 may be adjusted by reducing the number of elements used for transmitting a signal, receiving a signal, or both transmitting and a receiving a signal with the network using the first communication protocol mentioned above. Further, in some embodiments, the number of elements in all or a portion of the multi-element antenna in access node 110 (e.g., the first set of elements) is reduced by a factor that is a multiple of two.

As an example, a multi-element antenna array in access node 110 includes 64 antenna elements and uses 32 elements in a first set for operating with the first communication protocol (e.g., 5G) and the 32 remaining elements in a second set for operating with the second communication protocol (e.g., 4G). Following the adjustment or reduction, the number of elements used for operating with the first communication protocol is reduced to 16 from the initial 32 elements. The reduction to 16 elements lowers or reduces the antenna gain of the first set of elements by approximately three decibels (dB). The lower antenna gain may result in reduced or lowered effective incident radiated power (EIRP) as well as increased or widened effective antenna beamwidth which limits signal reception range. The combination of the reduced or lowered EIRP and limited signal reception range results in lower performance of data streams at longer distances away from access node 110 while having less of an effect on the performance of data streams at shorter distances away from access node 110.

In some embodiments, the adjusting of the multi-element antenna in access node 110 may include reducing the number of elements used for either transmitting a communication signal or receiving a communication, but not both at the same time. For instance, as a result of adjusting the multi element antenna in access node 110, a reduced number of elements (e.g., in the first set of elements) are operational for transmitting communication signals while all the initial elements are still operational for receiving communication signals using the first communication protocol (e.g., 5G).

In some embodiments, the determining the value associated with data rate for a set of wireless devices (e.g., wireless devices 120, 130, 140) may include calculating or measuring a bit rate or any value associated with bit rate, including the bit rate for the radio downlink, also known as the forward link, from access node 110 to the wireless devices. In other embodiments, the determining the value associated with the data rate may include the calculating or measuring bit rate or any value associated with bit rate for the radio uplink, also known as the reverse link, from the wireless devices (e.g., wireless devices 120, 130, 140) to access node 110 or may include any combination of values associated with bit rates for the radio downlink and radio uplink. In still other embodiments, the value associated with the data rate may include the bit rate or a value associated with the bit rate for the backhaul portion of the network, typically referring to the communication between communication network 101 and the access node 110, through gateway node(s) 102. Other similar communication parameters may be calculated or measured and used as are known to those skilled in the art including, but not limited to, data throughput of radio downlink and/or radio uplink, loading factors, load balancing factors, packet loss rate, packet error rate, and packet delay spread. Many of these and other similar parameters are measured and/or calculated as part of the radio resource management software modules that reside in either access node 110 or controller node 104.

In some embodiments the determining the value associated with data rate for the set of wireless devices (e.g., wireless devices 120, 130, 140) in the wireless network using the first communication protocol (e.g., 5G) may include determining an aggregate data rate for all of the wireless devices in the wireless network using the first communication protocol.

In some embodiments, the mechanism for determining the number of wireless devices in the wireless network using the first communication protocol may include segmenting the cell or sector 115 into two or more regions. For instance, a first region may be defined as a cell center region that includes any wireless device operating within a specified distance from access node 110 or the communication tower. A second region may be defined as a cell edge region that includes any wireless device operating within cell or sector 115 but outside the specified distance for the cell center region. The set of wireless devices used for determining the value may include wireless devices in either the cell center or the cell edge. Alternatively, the set of wireless devices used for determining the value may include wireless devices for both the cell center and cell edge and may be partitioned in terms of a percentage of wireless devices from each of the regions. It is important to note that more than two regions may be identified and one or more of the values may be measured and/or calculated for the set of wireless devices based on the region as part of determining if the value exceed the threshold value.

In some embodiments, determining the value associated with data rate for the set of wireless devices in the wireless network using the first communication protocol (e.g., 5G) may further include determining that value over a period of time. For example, physical resource block utilization for all the wireless devices serviced by access node 110 in the wireless network may be measured as part of a radio resource control function in a sector over a 24 hour period of time. The maximum value in that period of time is selected as the value associated with data rate. In another example, the bit rate used for all wireless devices in the wireless network serviced by access node 110 in sector 115 when using a 5G communication protocol is measured over a rolling four hour period of time. An average value for bit rate used for any four hour period is calculated and used as the value associated with bit rate. It is important to note that other possible values may be measured and computed over time as are well known to one skilled in the art.

Some additional mathematical functions, such as statistical analysis, may be incorporated with the determination of the value associated with data rate for the set of wireless devices (e.g., wireless devices 120, 130, 140) in the wireless network. The statistical analysis may further include using numbers or values for data rates, bit rates, packet rates, loading, or throughput that are taken over a period of time. For example, a value may be determined for a peak throughput load based on using statistical analysis of throughput data taken over the previous hours of time for the set of wireless devices in the wireless network. Any or all of these values or numbers based on statistical analysis may be provided and/or used in calculating the value associated with data rate and used for determining if the value exceeds the threshold value. It is important to note that other possible values may be computed or calculated using statistical analysis as are well known to one skilled in the art.

In some embodiments, the request to operate in the wireless network using the first communication protocol by wireless device 150 may be initially denied when it is determined that the number of wireless devices using the first communication protocol equals the threshold number of wireless devices. The request may be denied in order to permit any adjustment of the operating parameter of the multi-element antenna to take effect in the deployment and configuration of the wireless network In some embodiments, the adjustment to the operating parameter of the multi-element antenna when it is when it is determined that the value associated with data rate for a set of wireless devices in the wireless network using the first communication protocol exceeds the threshold value may force at least one of the plurality of wireless devices currently in the wireless network and using the first communication protocol to cease operating in the wireless network using the first communication protocol. These devices leave the wireless network and send a request for access to the wireless network using the second communication protocol if these devices are not already operating in dual-connect mode. One or more wireless devices, particularly those devices that are located near the cell edge for the wireless network serviced the access node or communication tower, may send a request for handover to join a different cell of the wireless network serviced by a different access node communication tower.

As an example of forcing one or more wireless devices to cease operating in the wireless network using the first communication protocol, wireless devices 120 and 130 are illustrated in FIG. 1 as being close to access node 110 and may be considered as being in the cell center of sector 115. In contrast, wireless device 140 is illustrated as being a greater distance from access node 110 and may be considered as being in the cell edge of sector 115. Following the adjustment to the operating parameter of the multi-element antenna in access node, the resulting reduced performance and/or reduced coverage area capability may result in degradation of data stream 145 communicating with wireless device 140 when using the first communication protocol. As a result, wireless device 140 may provide a request to access node 110 to drop services and cease communicating in the wireless network using the first communication protocol (e.g., 5G). Wireless device 150 may continue communicating in the wireless network using another communication protocol (e.g., 4G) or request to join the wireless network using another communication protocol. Wireless device 150 may instead request a handover to another access node servicing a sector (not shown) in the wireless network that is adjacent to sector 115 based on the location of wireless device 150 and proximity to adjacent sectors.

In some embodiments, wireless device 150 may be the wireless device forced to request access to, or remain on, the wireless network using the second communication protocol or may be forced to request a handover to a different cell or sector as described above, depending on the location of the new or additional wireless device 150 and its proximity to the cell edge or cell center sector 115. Such a condition may occur if, for instance, none of the wireless devices currently in the wireless network using the first communication protocol cease operation in the wireless network using the first communication protocol.

In some embodiments, the request made by wireless device 150 to operate in the wireless network using the first communication protocol may be accepted after at least one of the plurality of wireless devices ceases operating in the wireless network using the first communication protocol.

The operation of system 100 in a manner to manage data throughput of wireless devices in the wireless network serviced by sector 115 is intended to mitigate or eliminate the impact of adding wireless devices to the wireless network, when these added devices request to join using a high performance communication protocol, such as 5G. The operation may further assure that some or all of the users of wireless devices 120, 130, and 140, as well as other devices currently in the wireless network, do not perceive a degradation of performance, such as in terms of quality of service (QOS), latency of delivery, or buffering delay, of one or more services that may require use of the higher performance communication protocol provided over the wireless network and are currently needed by those users.

Access node 110 may comprise a processor and associated circuitry to execute or direct the execution of computer-readable instructions to perform operations such as those further described herein. Briefly, access node 110 may retrieve and execute software from storage, which may include a disk drive, a flash drive, memory circuitry, or some other memory device, and which may be local or remotely accessible. The software comprises computer programs, firmware, or some other form of machine-readable instructions, and may include an operating system, utilities, drivers, network interfaces, applications, or some other type of software, including combinations thereof. Further, access node 110 may receive instructions and other input at a user interface. Access node 110 communicates with gateway node 102 and controller node 104 via communication links 106, 107. Access node 110 may communicate with other access nodes (not shown) using a direct link such as an X2 link or similar.

Wireless devices 120, 130, 140, as well as new or additional wireless device 150, may be any device, system, combination of devices, or other such communication platform capable of communicating wirelessly with access node 110 using one or more frequency bands deployed therefrom. Wireless devices 120, 130, 140, as well as new or additional wireless device 150, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Communication network 101 may be a wired and/or wireless communication network, and may comprise processing nodes, routers, gateways, and physical and/or wireless data links for carrying data among various network elements, including combinations thereof, and may include one or more of a local area network a wide area network, and an internetwork (including the Internet). Communication network 101 may be capable of carrying data including, but not limited to, data to support voice, push-to-talk, broadcast video, and data to support wireless network protocols by wireless devices 120, 130, and 140 as well, as new or additional wireless device 150. Wireless network protocols may comprise multimedia broadcast multicast services (MBMS), code division multiple access single carrier radio transmission technology (CDMA 1×RTT), Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), 4G, LTE Advanced, 5G, 5G New Radio ("5G NR"), or 5G LTE. Wired network protocols that may be utilized by communication network 101 comprise Ethernet, Fast Ethernet, Gigabit Ethernet, Local Talk (such as Carrier Sense Multiple Access with Collision Avoidance (CSMA/CD)), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 may use various communication media, such as air, space, metal, optical fiber, or some other signal propagation path including combinations thereof. Communication links 106, 107 may be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link Gateway node(s) 102 may be any network node(s) configured to interface with other network nodes using various protocols. Gateway node(s) 102 may communicate user data over system 100. Gateway node(s) 102 may be a standalone computing device, computing system, or network component, and may be accessible using a communication interface connection (e.g., a wired or wireless connection), or through an indirect connection such as through a computer network or communication network. For example, gateway node(s) 102 may include a serving gateway (SGW) and/or a public data network gateway (PGW), etc. One of ordinary skill in the art would recognize that gateway node(s) 102 is not limited to any specific technology architecture, such as LTE or 5G NR, and may be used with any network architecture and/or protocol.

Gateway node(s) 102 may comprise a processor and associated circuitry to execute or direct the execution of computer-readable instructions to obtain information. Gateway node(s) 102 may retrieve and execute software from storage, which can include a disk drive, a flash drive, memory circuitry, or some other memory device, and which can be local or remotely accessible. The software may include, among other things, computer programs, firmware, or some other form of machine-readable instructions, and may include an operating system, utilities, drivers, network interfaces, applications, or some other type of software, including combinations thereof. Gateway node(s) 102 may also receive instructions and other input through some type of a user interface (not shown).

Controller node 104 may be any network node configured to communicate information and/or control information over system 100. Controller node 104 may be configured to transmit control information associated with a handover procedure. Controller node 104 may be a standalone computing device, computing system, or network component, and may be accessible using a communication interface connection (e.g., a wired or wireless connection), or through an indirect connection such as through a computer network or communication network. For example, controller node 104 may include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as LTE or 5G NR, and can be used with any network architecture and/or protocol.

Controller node 104 may comprise a processor and associated circuitry to execute or direct the execution of computer-readable instructions to obtain information. Controller node 104 may retrieve and execute software from storage, which may include a disk drive, a flash drive, memory circuitry, or some other memory device, and which may be local or remotely located but accessible from that remote location. In an exemplary embodiment, controller node 104 includes a database 105 for storing information related to capabilities of wireless devices 120, 130, 140, including MIMO capabilities, real-time and/or historic information related to throughput of access node 110, sector 115, etc. This information may be requested by or shared with access node 110 via links 106, 107, or other communication connections, such as X2 connections, and so on. The software comprises computer programs, firmware, or some other form of machine-readable instructions, and may include an operating system, utilities, drivers, network interfaces, applications, or some other type of software, and combinations thereof. Controller node 104 may also receive instructions and other input through some form of a user interface (not shown).

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the processing mechanisms, devices, and equipment described above in system 100 may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, controller node 104, and/or network 101. In some embodiments, all or portions of the software programs that control the operations of access node 110, controller node 104, and/or gateway node(s) 102 may be stored external to these devices or stored in the cloud. The software is then downloaded for external storage or the cloud to the devices, as needed, a network, such as communication network 101.

Figure 2:
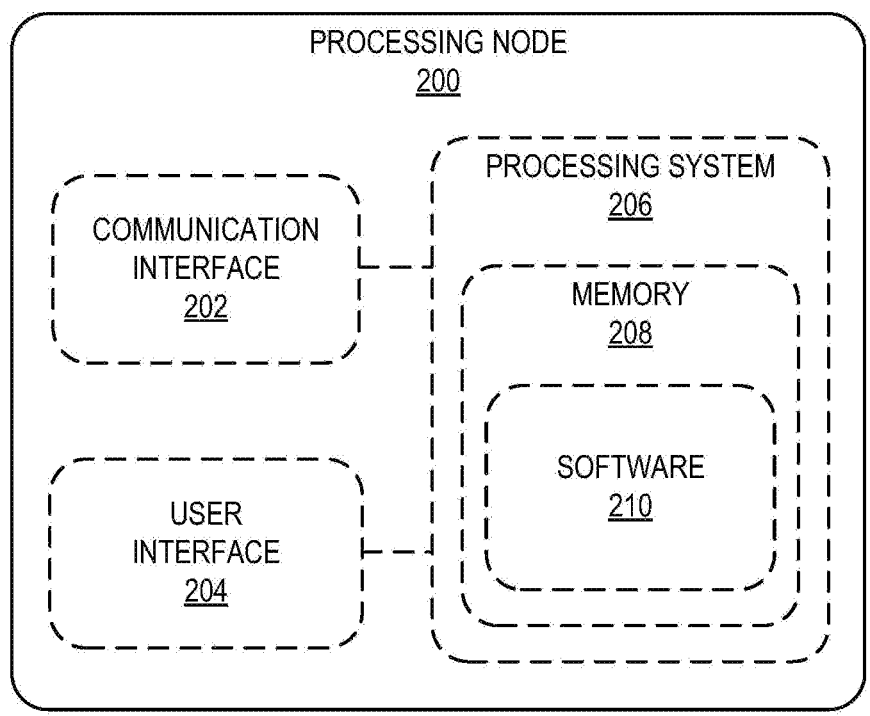
FIG. 2 depicts an exemplary processing node for managing wireless devices in wireless networks, such as networks configured to utilize MIMO.

FIG. 2 depicts an exemplary processing node 200 used in a communication system, such as system 100 depicted in FIG. 1. Processing node 200 comprises a communication interface 202, user interface 204, and processing system 206 in communication with communication interface 202 and user interface 204. Processing node 200 may be included as part of several elements of system 100 depicted in FIG. 1 including, but not limited to, gateway node(s) (102), controller node 104, and access node 110. Processing node 200 may also be included in other elements that have not been depicted as part of system 100 but which may be included as part of the operation of a communication system similar to system 100 depicted in FIG. 1. Processing node 200 may further include other components such as a power management unit, a control interface unit, etc., which have been omitted here for clarity.

In processing node 200, a processing system 206 includes storage 208. Storage 208 may store software 210 which is used in the operation of the processing node 200 as well as any data needed or produced by processing system 206. Storage 208 may include one or more of disk drives, flash drives, data storage circuitry, or some other memory devices. Storage 208 may also include at least one memory element configured as a buffer.

Software 210 may include one or more computer programs, firmware, or some other form of machine-readable instructions, including an operating system, utilities, drivers, network interfaces, applications, or some other type of software. For example, software 210 may include a coherence determination software module. Processing system 206 may include a microprocessor and other circuitry to retrieve and execute software 210 from storage 208.

Communication interface 202 permits processing node 200 to communicate with other network elements, such as the elements included in gateway node(s) 102, controller node 104, and access node 110 described in FIG. 1. User interface 204 permits the configuration and control of the operation of processing node 200 and may further provide information (e.g., visual or aural information) regarding the operations or status of processing node 200 or other elements and devices in communication with processing node 200.

In operation and among other performed functions, processing node 200 uses processing system 206 to manage wireless devices (e.g., wireless devices 120, 130, 140, and 150 in FIG. 1) as part of a communication system deployed in a wireless network. Processing node 200 may receive a request from a wireless device (e.g., wireless device 150 in FIG. 1) for access to a wireless network communicating through an access node (e.g., access node 110 in FIG. 1) using a first communication protocol, the wireless network using at least two communication protocols simultaneously. The wireless device may make the request as part of initially joining the network or may join the wireless network after making a request to join the wireless network using a second communication protocol different from the first communication protocol. Processing node 200 may further determine that a value associated with data throughput for a set of wireless devices in the wireless network using the first communication protocol exceeds a threshold value. Processing node 200 may also perform any other measurements or calculations that are necessary for the determination and as have been described earlier in FIG. 1. Processing node 200 may also store any results, intermediate or otherwise, from the calculations or determinations performed in storage 208. Processing node 200 may further provide instructions, through communication interface 202, for adjusting an operating parameter of an antenna array in an access node for communicating signals in the wireless network using the first communication protocol when it is determined that the value associated with data throughput for the set of wireless devices exceeds the threshold value. The instruction may include, among other things, commands to reduce the number of elements used for transmission and/or reception of communication signals in the portion of the multi-element antenna. Some or all the instructions for executing these and other aspects of the operation of processing node 200 may be stored and retrieved from software 210. It is important to note many of the same variations of embodiments described earlier in FIG. 1 may similarly be applicable to the operation of processing node 200.

Figure 3:
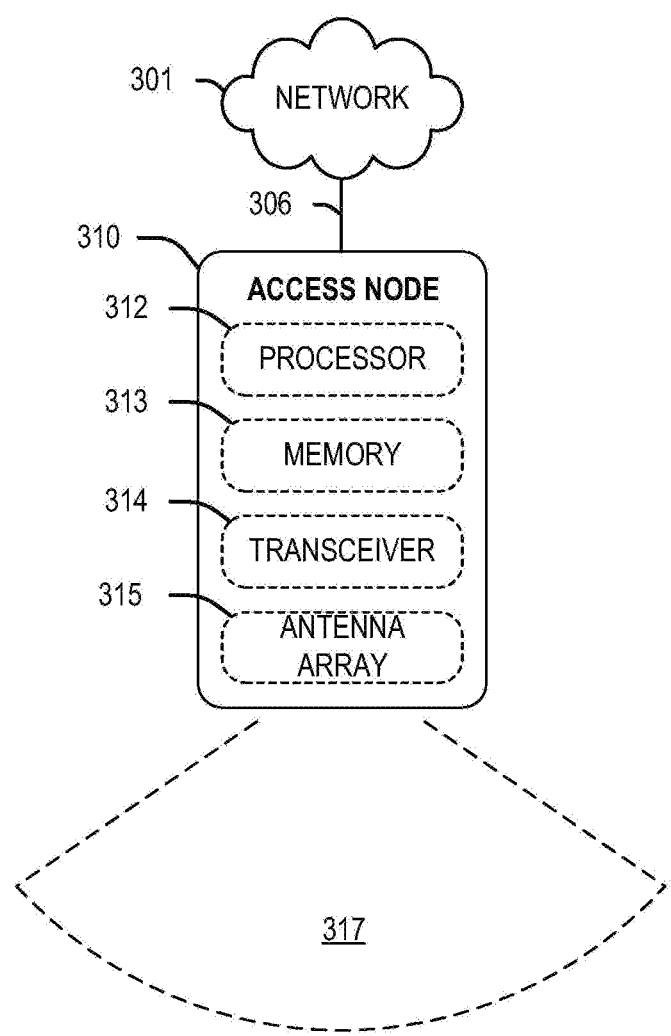
FIG. 3 depicts an exemplary access node for managing wireless devices in wireless networks, such as networks configured to utilize MIMO.

FIG. 3 depicts an exemplary access node 310 used in a communication system, such as system 100 depicted in FIG. 1. Access node 310 is configured as an access point for providing network services between network 301, through components such as gateway nodes and controllers (not shown), to end-user wireless devices, such as wireless devices 120, 130, 140, and 150 described in FIG. 1, in a cell or sector 317. Access node 310 is illustrated as comprising a processor 312 for executing the logical modules, a memory 313 for storing logical modules that perform operations described herein, and a transceiver 314 for transmitting and receiving signals via antenna array 315. Further, access node 310 is communicatively coupled to network 301 via communication interface 306, which may be any wired or wireless link as described above.

In general, access node 310 operates in a manner similar to that described for access node 110 described in FIG. 1 including any of the various aspects of operation in any of the embodiments. More specifically, access node 310 uses a combination of processor 312, memory 313, transceiver 314, and antenna array 315 to control and manage various aspects of communicating with a set of wireless devices (e.g., wireless devices 120, 130, 140, 150 in FIG. 1) in a wireless communication system, such as system 100 described in FIG. 1. In an embodiment, memory 313 comprises one or more logical modules or program modules that are executed by processor 312 to enable access node 310 to receive a signal or instructions (e.g., at processor 312 through network 301) from a processing node or other processing device located external to access node 300 to adjust an operating parameter of some aspect of the operation of one or more elements of antenna array 315. Access node 310 adjusts the operating parameter for all or a portion of antenna array 315 through a control signal, in some cases using transceiver 314 and/or provided by processor 312, when it is determined that allowing a wireless device (e.g., wireless device 150 in FIG. 1) causes a value associated with data rate for a set of wireless devices in the wireless network using the first communication protocol (e.g., 5G) to exceed a threshold value. The operating parameter may include, among other things, enabling or disabling one or more antenna elements in antenna array 315 with the wireless devices located in sector 317 as part of the wireless network.

In some embodiments, access node 310 may be part of a system for managing data throughput of wireless devices in a wireless network configured to utilize a MIMO operating mode. In these embodiments, access node 310 may also include a processing node (e.g., processing node 200 described in FIG. 2) which is configured to perform operations including receiving a request from a wireless device to operate in the wireless network using a first communication protocol, the wireless network deploying communications with wireless devices using at least two communication protocols simultaneously and determining that a value associated with data rate used by a set of wireless devices in the wireless network using at least one of the at least two communication protocols exceeds a threshold value. An operating parameter for some portion of antenna array 315 is adjusted, in some cases using control information from transceiver 314, when it is determined that the value exceed the threshold value.

Figure 4:
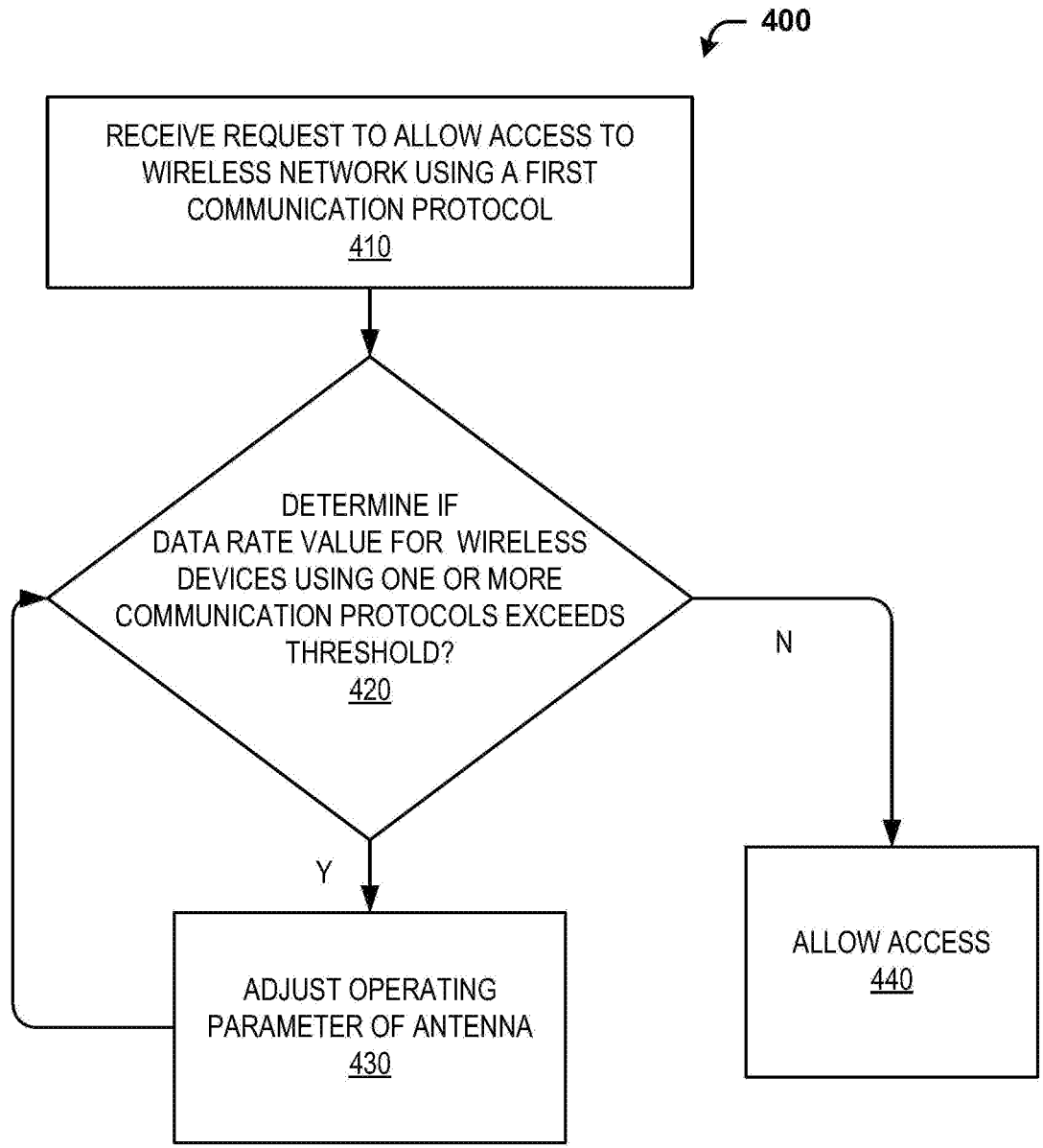
FIG. 4 depicts an exemplary process for managing wireless devices in wireless networks, such as networks configured to utilize MIMO.

FIG. 4 depicts an exemplary process 400 for managing wireless devices in wireless networks. Process 400 may be particularly suited for managing wireless devices in wireless networks employing MIMO operation, such as SU-MIMO, MU-MIMO, and massive MIMO using any form of MIMO. Process 400 is primarily described with respect to an access node, such as access node 310 described in FIG. 3. The access node may also include a processing node, such as processing node 200 described in FIG. 2. Process 400 may also be performed by an access node as configured and depicted in FIG. 1 (i.e., access node 110) or performed by a combination of elements depicted in FIG. 1, such as access node 110 and controller node 104. In other embodiments, the method can be implemented with any suitable network element. Although process 400 depicts steps performed in a particular order for purposes of illustration and discussion, the operations discussed herein are not limited to any particular order or arrangement. One skilled in the art, using the disclosures provided herein, will also appreciate that one or more of the steps of process 400 may be omitted, rearranged, combined, and/or adapted in various ways.

At step 410, a request is received from a wireless device over a wireless network, such as the wireless network deployed in a sector (sector 317). The wireless network may typically include an access node (e.g., access node 310) configured to deploy communications with a plurality of wireless devices in a sector using at least two communication protocols simultaneously. The request includes a request for access to operate in the wireless network using a first communication protocol.

In some embodiments, the request may be received, at step 410, from a wireless device that has recently entered the area serviced by the wireless network. The wireless device may have services already in use and may have been connected to a different wireless network serviced by a different access node using the first protocol. Alternatively, the request may be received, at step 410, from a new wireless device that has recently been powered on or is requesting to establish a new service (e.g., high definition video streaming service) as part of a request made by the user of the new wireless device in the wireless network using the first communication protocol.

In some embodiments, the wireless device may initially request access to the wireless network using a second communication protocol before requesting access using the first communication protocol. For instance, in order for a wireless device to join the wireless network, the wireless device goes through an initialization procedure for verification or authentication. The wireless device joins the network using a second, reduced performance, or older version communication protocol (e.g., 4G) to establish signaling status, authentication, and capabilities between the access node or communication tower and the new wireless device as well as establish operation of some services. Further, the wireless device may remain operational for one or more services (e.g., telephone service) using this second communication protocol even after joining the wireless network using the first communication protocol. Such a configuration may be known as a dual-connect configuration and may use the first communication protocol (e.g., 5G) for higher performance services, such as high definition video streaming services.

At step 420, a determination is made as to whether a value associated with data rate used by a set of wireless devices in the wireless network using at least one of the at least two communication protocols exceeds a threshold value. In some embodiments, the mechanism for determining whether the value associated with data rate used by a set of wireless devices in the wireless network using at least one of the at least two communication protocols, at step 420, may include segmenting the cell or sector (e.g., sector 317) that is serviced by the access node (e.g., access node 310) into two or more regions. For instance, a first region may be defined as a cell center region that includes any wireless device operating from a location within a specified distance from the location of the access node or communication tower. A second region may be defined as a cell edge region that includes any wireless device operating from a location outside the specified distance defined for the cell center region. The set of wireless devices used for determining the value may include wireless devices in either the cell center or the cell edge. Alternatively, the set of wireless devices used for determining the value may include wireless devices for both the cell center and cell edge and may be partitioned in terms of a percentage of wireless devices from each of the regions. It is important to note that more than two regions may be identified and one or more of the values may be measured and/or calculated for the set of wireless devices based on the region as part of determining if the value exceed the threshold value.

In some embodiments, the set of wireless devices may include all wireless devices serviced by an access node (such as access node 310) using any or all of the possible communication protocols including, for instance, 4G and 5G. The set of wireless devices may further include all devices serviced by the access node and covering more than one cell or sector service by that access node.

In some embodiments, the determining the value associated with data rate used by the set of wireless devices may include calculating or measuring a bit rate or any value associated with bit rate, including the bit rate for the radio downlink, radio uplink, or any combination of both. In other embodiments, the value associated with the data rate may include the bit rate or a value associated with the bit rate for the backhaul portion of the network. Other similar communication parameters may be calculated or measured and used as are known to those skilled in the art including, but not limited to, data throughput of radio downlink and/or radio uplink, loading factors, load balancing factors, packet loss rate, packet error rate, and packet delay spread.

In some embodiments, determining the value associated with data rate for the set of wireless devices in the wireless network using at least one of the at least two communication protocols may further include determining that value over a period of time. Additionally, some form of statistical analysis may be incorporated with the determination of the value associated with data rate used by the set of wireless devices in the wireless network. The statistical analysis may further include using numbers or values for data rates, bit rates, packet rates, loading, or throughput, including values that are taken over a period of time.

If, at step 420, the value associated with data rate used by the set of wireless devices currently in the wireless network using at least one of the at least two communication protocols exceeds the threshold value, then, at step 430, an operating parameter of an antenna, such as antenna array 315 in access node 310 or a multi-element antenna used with access node 110 in FIG. 1, is adjusted.

In some embodiments, the antenna may be configured to operate in one of several MIMO operating modes in the wireless network including, but not limited to, SU-MIMO, MU-MIMO, and massive MIMO using any form of MIMO. Further, in some embodiments the antenna includes a first portion or section having a first set or subset that with a first number of elements used for communicating in the wireless network using a first communication protocol (e.g., 5G). It is important to note that, in some instances, the first set of elements constitute all of the elements of the antenna. Further, the antenna may be one of a set of antennas, with each one of the set covering a radial sector outward from a fixed location (e.g., a communication tower that includes a communication system).

Further, in some embodiments, the antenna (e.g., antenna array 315) further includes another or second portion or section having a second set or subset of elements with a second number of elements. The elements in the second set of elements are different from the elements in the first set of elements. The second set of elements is used for communication on the same wireless network as the first set of elements but use a second communication protocol that is different from the first communication protocol. For example, this second communication protocol may be 4G. It is important to note that the number of elements in the second set may be the same or different from the number of elements in the first set.

In some embodiments, all or a portion of antenna (e.g., antenna array 315) is adjusted, at step 430, by reducing the first number of elements used for transmitting a signal, receiving a signal, or both transmitting and receiving a signal within the wireless network in a cell or sector (e.g., sector 317) using the first communication protocol (e.g., 5G) mentioned above. Further, in some embodiments, the first number of elements in the first set of elements is reduced by a factor that is a multiple of two. For example, initially and prior to any adjustment, at step 430, the antenna is configured as a multi-element antenna including a total of 64 elements. The antenna includes two portions, each having a set of elements. The number of elements in the first set and operated with the first communication protocol is 32 and the number of elements in the second set and operated with the second communication protocol is 32 elements, the remaining 32 elements. Following the adjustment, at step 430, the number of elements that remain operational (i.e., used for transmitting and/or receiving) in the first set of elements with the first communication protocol is 16 of the original 32 elements. The remaining 16 or other number of elements from the first set are not operational (i.e., not used for transmitting and/or receiving). A different reduction in the number of elements is possible and the reduction may be performed in more than one step iteratively as part of process 400 (not shown) based on desired characteristics for the operation parameters of the antenna.

In some embodiments, the request for access to the wireless network using the first communication protocol by the wireless device, at step 410, may be initially denied when it is determined that the value associated with data rate used by a set of wireless devices in the wireless network using at least one of the at least two communication protocols exceeds a threshold value. The request may be denied in order to permit any adjustment of the operating parameter of the antenna made, at step 430, to take effect in the deployment and configuration of the wireless network.

In some embodiments, the adjustment, at step 430, made to the operating parameter of the antenna (e.g., antenna array 315) may force at least one of the plurality of wireless devices currently in the wireless network and using the first communication protocol to cease operating in the wireless network using the first communication protocol. For example, wireless devices located at a further distance from the access node (e.g., access node 310) or communication tower, particularly those that may be considered in the cell edge of the cell or sector (e.g. sector 317) may suffer some communication performance degradation as described earlier. Other wireless devices located closer to the access node or communication tower, particularly those that may be considered in the cell center of the cell or sector may see little or no change in communication performance. As a result of the communication performance degradation suffered by one or more of the wireless devices located in the cell edge, some services, such as high definition video streaming services, may not be able to be properly used. Those wireless devices may continue communicating in the wireless network using another communication protocol (e.g., 4G) if access is already established or request to join the wireless network using another communication protocol. Those wireless devices may instead request a handover to another wireless network being service by a cell or sector (not shown) that is adjacent to the current cell or sector (e.g., sector 317) based on the location of that wireless device and proximity to adjacent sectors.

If, at step 420, the value associated with data rate used by a set of wireless devices in the wireless network using at least one of the at least two communication protocols does not exceed the threshold value, then, at step 440, the request by the new wireless device to operate in the wireless network using the first communication protocol is accepted and the new wireless device is allowed access to the services provided in the wireless network using the first communication protocol.

After completion of adjusting the operating parameter of the antenna (e.g., antenna array 315), at step 430, and after any changes have taken place with operation of the wireless devices in the wireless network as a result of the adjustment, process 400 returns to step 420 where another determination is made as to whether the value associated with data rate used by a set of wireless devices in the wireless network using at least one of the at least two communication protocols exceeds a threshold value.

Figure 5:
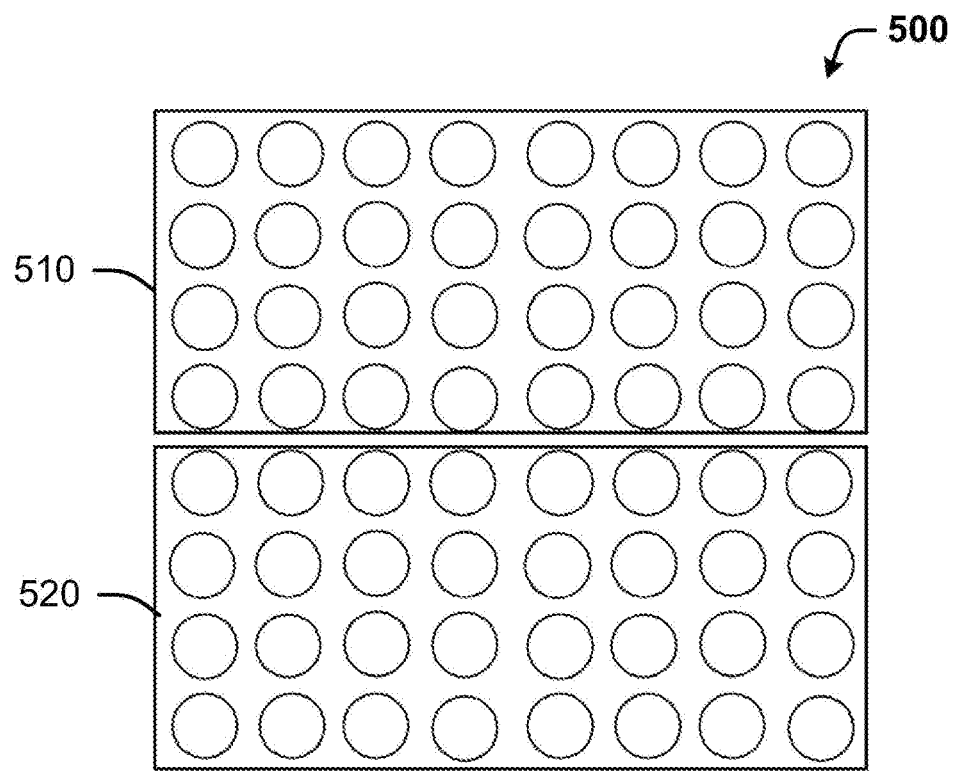
FIG. 5 depicts an exemplary antenna in a signal communication configuration as part of managing wireless devices in wireless networks, such as networks configured to utilize MIMO.

FIG. 5 depicts an exemplary antenna 500 in a signal communication configuration as part of managing signal transmission characteristics in wireless networks. Antenna 500 may be configured as an antenna array, such as antenna array 315, configured to utilize MIMO operation in conjunction with access node 310 in FIG. 3. Antenna 500 may also be configured as an antenna array in conjunction with access node 110 in system 100 depicted in FIG. 1 or configured as an antenna array to use with any communication system employing MIMO communication techniques, particularly those associated SU-MIMO, MU-MIMO, and massive MIMO using any form of MIMO communication to a plurality of wireless devices. Antenna 500 may be considered as operating in an initial operating condition prior to any adjustment using the elements described for process 400 described in FIG. 4.

Antenna 500 illustrates an array of 64 individual antenna elements used for both transmission and reception of signals in conjunction with a transceiver element, such as transceiver 314, as part of an access node, such as access node 310. Antenna 500 is arranged into two subgroups of antenna elements, subgroup 510 and subgroup 520, two from two arrays of 32 elements. Each of subgroups 510 and subgroup 520 are used in the same communication system but each transmit and receive using a different communication protocol. In one embodiment, subgroup 510 communicates using a 5G protocol and subgroup 520 communicates using a 4G protocol.

Figure 6:
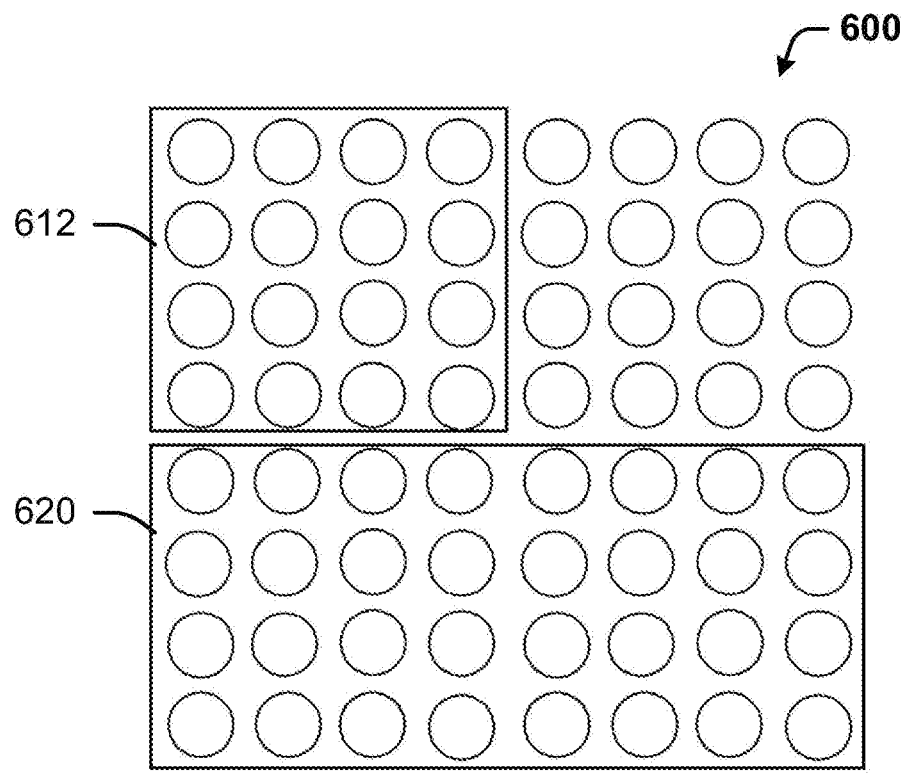
FIG. 6 depicts an exemplary antenna in another signal communication configuration as part of managing wireless devices in wireless networks, such as networks configured to utilize MIMO.

FIG. 6 depicts an exemplary antenna 600 in another signal communication configuration as part of managing signal transmission characteristics in wireless networks. Antenna 600 may be configured as an antenna array, such as antenna array 315, configured to utilize MIMO operation in conjunction with access node 310 in FIG. 3. Antenna 600 may also be configured as an antenna array in conjunction with access node 110 in system 100 depicted in FIG. 1 or configured as an antenna array for use with any communication system employing MIMO communication techniques, particularly those associated SU-MIMO, MU-MIMO, and massive MIMO using any form of MIMO communication to a plurality of wireless devices. Antenna 600 may be considered as operating in an exemplary operating condition following adjustment using the elements described for process 400 described in FIG. 4.

Antenna 600 illustrates an antenna array of 64 individual antenna elements with the operational elements arranged into two subgroups of antenna elements, subgroup 612 and subgroup 620. Subgroup 620 operates in a manner similar to that described for subgroup 520 in FIG. 5. Subgroup 612 similarly operates in the same communication system as subgroup 620 but operates using a different communication protocol (e.g., 5G) than is used with subgroup 620, the same communication protocol as for operation of subgroup 510 in FIG. 5. Subgroup 612 has been adjusted or reduced to only use 16 of the original 32 elements that were operated as subgroup 510 in FIG. 5. The reduction in elements may be performed by one or more of several different mechanisms including enabling or disabling elements in antenna 600 under control of a transceiver or as part of an access node.

By configuring subgroup 612 of antenna 600 to operate with 16 elements instead of 32 elements, the antenna gain of subgroup 612 may be reduced or lowered by approximately three decibels (dB). The lower antenna gain may also reduce or lower the effective incident radiated power (EIRP) of subgroup 612 as well as increase or widen the effective transmission beamwidth of subgroup 612, lowering the signal reception sensitivity of subgroup 612. As a result, the effective communication range of any communication signals transmitted or received using subgroup 612 of antenna 600 will be reduced or lowered by approximately one half of the original communication range. The lowered communication range may force one or more wireless devices, particularly those wireless devices located near a cell edge of a cell or sector serviced by subgroup 612, to cease operation in the wireless network using the first communication protocol (e.g. 5G).

It is important to note that subgroup 620 of antenna 600 may be configured to operate, after the adjustment as described above, using more or less elements than the 16 elements as described. In some embodiments, the reduction in number of elements may be any factor of two of the original number of elements in the subgroup (e.g., subgroup 510 is FIG. 5). Further, subgroup 612 may be adjusted iteratively as part of a series of configurations, either reducing or increasing the number of elements in a subgroup for use with the first communication protocol.

Figure 7:
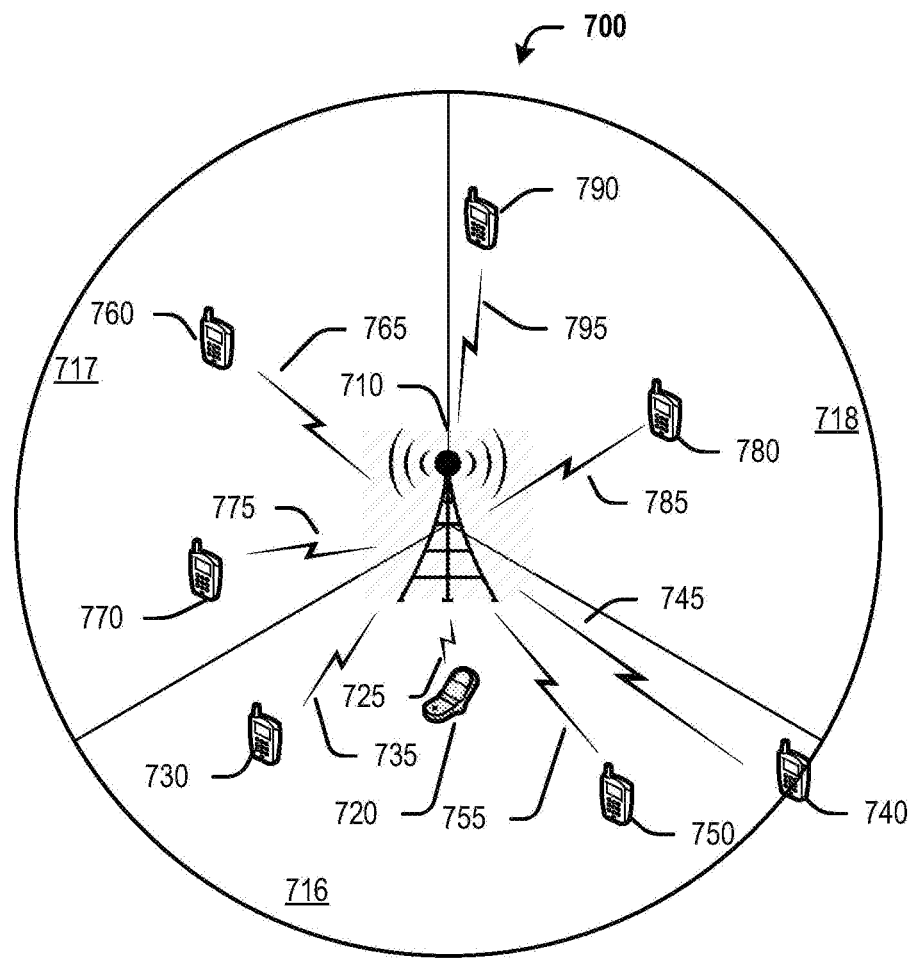
FIG. 7 depicts an exemplary system employing a plurality of sectors deployed by an access node and managing wireless devices in wireless networks, such as networks configured to utilize MIMO.

FIG. 7 depicts an exemplary system 700 employing a plurality of sectors serviced by an access node and managing wireless device in the wireless networks of each of the sectors. System 700 includes many features and elements that operate in a manner similar to that of system 100 depicted in FIG. 1 but not shown here (e.g., gateway nodes, controller node, communication network) and is particularly suited for operating in networks configured to utilize MIMO (e.g., SU-MIMO, MU-MIMO, etc.). System 700 further includes an access node 710 deploying communications in three sectors 716, 717, and 718 and operating with three separate antenna arrays (not shown) in access node 710. Wireless devices 720, 730, and 740, along with new or additional wireless device 750 are illustrated as being located within sector 716. Wireless devices 760 and 770 are illustrated as being located within sector 717 and wireless devices 780 and 790 are illustrated as being located within sector 718. Each sector 716, 717, 718 covers a separate, generally non-overlapping, portion of a circumference radially outward from the access node 710 each sector using a separate antenna array. For example, each sector 716, 717, 718 covers an approximately 120 degree arc portion of the circumference radially outward from access node 710. In other embodiments, other sectorization schemes, including more or fewer sectors, along with corresponding multi-element antennas or antenna arrays, are possible.

Access node 710 may be any network node configured to provide communication between end-user wireless devices and a communication network, such as the internet. Further, by virtue of comprising a plurality of antenna elements included as part of the antenna arrays as further described herein, access node 710 can simultaneously transmit each of a plurality of different MIMO data streams. MIMO data streams 725, 735, and 745 are illustrated communicating with wireless devices 720. 730, and 740 in sector 716. MIMO data streams 765 and 775 are illustrated communicating with wireless devices 760 and 770 in sector 717. MIMO data streams 785 and 795 are illustrated communicating with wireless devices 780 and 790 in sector 718. Moreover, it is noted that while two or three MIMO data streams are disclosed per sector, a larger or smaller number of wireless devices and MIMO data streams within the sectors in any combination can be implemented depending on the configuration of access node 710.

In some embodiments, more than one access node may be incorporated and used in conjunction with the plurality of multi-element antennas or antenna arrays to deploy communication in the sectors 716, 717, 718. For example, a first antenna array including a plurality of antenna elements may be coupled to a first access node and configured to deploy a first sector 716 (within which corresponding MIMO data streams may further be deployed using techniques such as, for example, beamforming, etc.), a second antenna array including a plurality of antenna elements may be coupled to a second access node and configured to deploy a second sector 717, and a third antenna array including a plurality of antenna elements may be coupled to a third access node and configured to deploy a third sector 718. For purposes of the description, access node 710 may refer to a single physical access node device or to a plurality of physical access node devices intended to operate collectively and cooperatively to deploy a sectorized wireless network.

Access node 710 operates in a manner similar in most aspects as access node 310 described in FIG. 3 or access node 110 described in FIG. 1. For example, access node 710, along with a processor or processing node (not shown) included internally or externally, may be configured to receive a request from wireless device 750 to operate in the wireless network serviced by sector 716 using a first communication protocol. The access node 710 is configured to deploy communications with a plurality of wireless devices in sector 716 using at least two different communication protocols. Access node 710, along with a processor or processing node, further determines whether a value associated with data throughput for a set of wireless devices in the wireless network using the first communication protocol exceeds a threshold value. If the value associated with data throughput exceeds the threshold number of wireless devices, then access node 710 adjusts an operating parameter of the antenna array in access node 710 used for communicating in sector 716. The threshold value used as part of the determination may be a maximum data throughput for the set of wireless devices. Alternatively, the threshold value may be a lower value than the maximum data throughput or may be a percentage of the maximum data throughput, such as 90 percent of the maximum data throughput for the set of wireless devices. Other threshold values may also be used.

In some embodiments, all or a portion of the antenna array in access node 710 used for communicating in sector 716 is adjusted by reducing the number of elements used for transmitting a signal, receiving a signal, or both transmitting and receiving a signal within the wireless network using the first communication protocol mentioned above. The reduction may be a factor that is a multiple of two from the original number of elements. The reduction may also be made in an iterative manner based on continued monitoring of the number of wireless devices using the first communication protocol.

In some embodiments, the adjustment to the operating parameter of the antenna array in access node 710 used for communicating in sector 716 may force at least one of the plurality of wireless devices currently in the wireless network and using the first communication protocol, such as wireless device 740, to cease operating in the wireless network using the first communication protocol. a wireless device, such as wireless device 740, is located near the cell edge of sector 716 and send a request for handover to join a different cell or sector of the wireless network, such as sector 718 or another adjacent sector (not shown). Wireless device 740, a different wireless device may also cease using the first communication protocol (e.g., 5G) and send a request for access to services in the wireless network using the second communication protocol (e.g., 4G) if these devices are not already operating in dual-connect mode.

In some embodiments, wireless device 750 may be denied access to the wireless network using the first communication protocol (e.g., 5G) and/or may be forced to request access to, or remain on, the wireless network using the second communication protocol (e.g., 4G) or may request a handover to a different cell in the wireless network as described above. Such a condition may occur if, for instance, none of the wireless devices currently in the wireless network using the first communication protocol cease using the first communication protocol.

If, after the adjustment of the antenna array in access node 710 and after at least one of the wireless devices ceases to use the first communication protocol (e.g., 5G) in sector 716, then the request made by wireless device 750 is accepted and access to wireless network by wireless device 750 using the first communication protocol is allowed.

Figure 8:
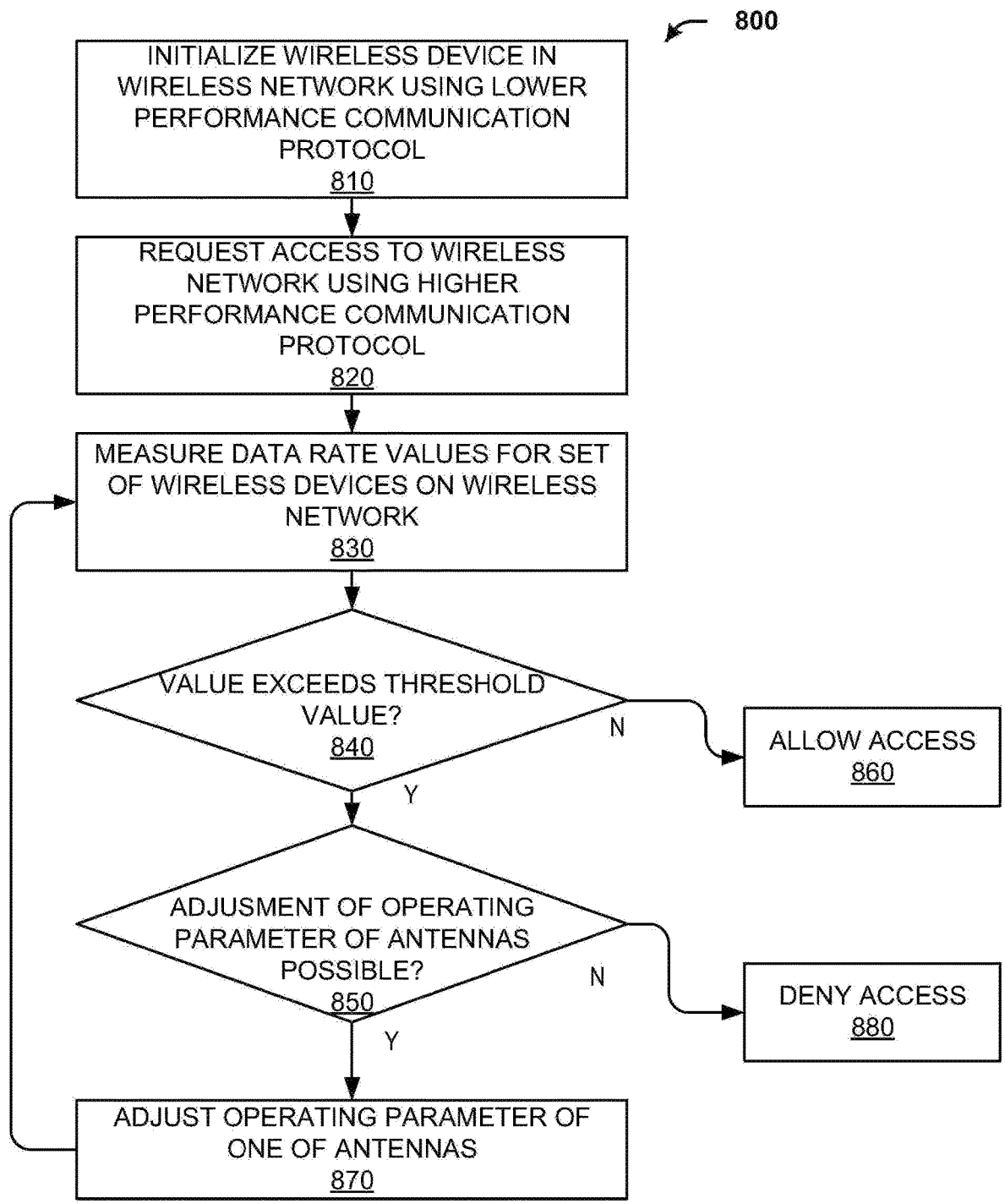
FIG. 8 depicts another exemplary process for managing wireless devices in wireless networks, such as networks configured to utilize MIMO.

FIG. 8 depicts another exemplary process 800 for managing signal transmission characteristics in wireless networks. Process 800 is primarily described with respect to access node 710. Process 800 may equally be implemented as part of access node 310 in FIG. 3 or access node 110 in FIG. 1. In other embodiments, process 800 can be implemented with any suitable network element configured to utilize MIMO operation, such as SU-MIMO, MU-MIMO, and massive MIMO using any form of MIMO. Although process 800 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At step 810, a wireless device (e.g., wireless device 750) entering into communication with the wireless network is initialized using an initial communication protocol. For instance, in order for a wireless device to join the wireless network, the wireless device goes through an initialization procedure for verification or authentication. The wireless device joins the network using a reduced performance, older version communication protocol (e.g., 4G) to establish signaling protocols between the access node or communication tower and the new wireless device. Further, the wireless device may remain operational for one or more services (e.g., telephone service) using this second communication protocol even after joining the wireless network using another, higher performance, communication protocol (e.g., 5G). Such a configuration may be known as a dual-connect configuration and may use the higher performance communication protocol, in conjunction with MIMO capabilities, for certain higher demand services, such as high definition video streaming services.

At step 820, a request is received by an access node (e.g., access node 710) from the wireless device (e.g., wireless device 750) for access to the wireless network using a higher performance communication protocol, such as 5G. In some embodiments, the request may be received from the wireless device, at step 820, after it has recently entered the area serviced by the wireless network and completed initialization, at step 810. The wireless device may have services already in use and may been connected to a different wireless network serviced by a different access node using the higher performance communication protocol. Alternatively, the request may be received from the wireless device, at step 820, after it was recently powered on and after completing initialization, at step 810. The request may further be received from the wireless device, at step 820, after having been in the wireless network for some period of time, as part of establishing a new service (e.g., high definition video streaming service) made by the user of the wireless device in the wireless network using the first communication protocol.

At step 830, one or more measurements or calculations for values associated with data throughput for a number of wireless devices in the wireless network using the higher performance communication protocol (e.g., 5G) are made. In some embodiments, measurements or calculations may be made for bit rate or any value associated with bit rate, including the bit rate for the radio downlink, radio uplink, or any combination of both. In other embodiments, measurements or calculations may be made for bit rate or a value associated with the bit rate for the backhaul portion of the network. Other similar communication parameters may be calculated or measured and used as are known to those skilled in the art including, but not limited to, data throughput of radio downlink and/or radio uplink, loading factors, load balancing factors, packet loss rate, packet error rate, and packet delay spread.

In some embodiments, measuring or calculating values associated with data throughput, at step 830, may further include measuring or calculating the values over a period of time. Additionally, some form of statistical analysis may be incorporated with the measurements or calculations. These measurements or calculations, at step 830, may be performed by access node 710 or in other components in the system (e.g., a controller node not shown).

In some embodiments, the set of wireless devices may include all wireless devices serviced by an access node (such as access node 710) using any or all of the possible communication protocols including, for instance, 4G and 5G. The set of wireless devices may further include all wireless devices serviced in more than one sector or all sectors (e.g., sectors 716, 717, 718) serviced by access node 710. In some embodiments, the cell or sector (e.g., sector 716) that is serviced by the access node (e.g., access node 710) may be segmented into two or more regions and some or all of the wireless devices from one or more of those regions may be included in the set. For instance, the segmentation may include two regions, a cell center region and cell edge region, as described above.

At step 840, a determination is made as to whether one or more of the measured or calculated values from step 840 associated with data throughput for a set of wireless devices in the wireless network using the first communication protocol exceeds a threshold value. The threshold value used as part of the determination may be a value associated with the maximum number of wireless devices that can be in the wireless network and serviced by access node 710 using the first communication protocol. Alternatively, the threshold may be a value associated with a lower number than the maximum number, such as one value less than the maximum number, or may be a percentage of the maximum number of devices, such as 90 percent of the maximum number of wireless devices. Other threshold values may also be possible.

If, at step 840, the one or more of the calculated or measured values from step 830 associated with data throughput of the set of wireless devices does not exceed the threshold value, then at step 860, the request by the wireless device, at step 820, is accepted and the wireless device is allowed to operate in the wireless network (e.g., wireless network in sector 716 and serviced by access node 710) using the higher performance communication protocol.

If, at step 840, the one or more of the calculated or measured values from step 830 associated with data throughput of the set of wireless devices exceeds the threshold value, then, at step 850, a determination is made as to whether an adjustment to one or more of the antennas in the access node (e.g., access node 710) deploying communications in a sector (e.g., sector 716) in the wireless network is possible or available.

As an example, one of the antenna arrays in access node 710 used for deploying communications in sector 716 includes 64 elements with all 64 elements used for transmitting and receiving signals using the higher performance communication protocol (e.g. 5G). Adjustments may be made to the antenna array to reduce the number of elements used for transmitting or receiving signals using the higher performance communication protocol. However, some limits may be placed on the minimum number of elements that must remain in use. The lower limit may be set to 4 elements. As a result, several adjustments may be made to the antenna array to reduce the number elements, first reducing the number of elements from 64 to 32 elements, second reducing the number of elements from 32 elements to 16 elements, and so on until the lower limit of elements that must remain in use is reached.

If, at step 850, an adjustment to one or more of the antennas in the access node (e.g., antenna arrays in access node 710) is possible and/or available, then at step 870, the operating parameter of the antenna deployed for communications in the sector, such as antenna array in access node 710 deployed for sector 716, is adjusted. In some embodiments, the adjusting of one of the antennas, at step 870, includes reducing the number of elements of the antenna that are used for transmitting a signal, receiving a signal, or both transmitting and a receiving a signal using a communication protocol (e.g., 5G) in the wireless communication network as described above. The example above reduces the number of elements by a factor of two, but in some embodiments, other adjustments or reductions may be made to the one or more antennas including any of the variations described in any of the embodiments above.

The adjustment of one or more of the antennas in the access node (e.g., antenna array for sector 716 in access node 710) may force at least one of the plurality of wireless devices (e.g., wireless devices 720, 730, 740) currently in the wireless network (e.g., sector 716) and using the first communication protocol to cease operating in the wireless network using the first communication protocol. These devices leave the wireless network and send a request for access to the wireless network using the second communication protocol if these devices are not already operating in dual-connect mode. One or more wireless devices, particularly the wireless devices that are located near the cell edge for the wireless network serviced by the access node or communication tower, may send a request for handover to join a different cell or sector for the wireless network serviced by a different access node and/or communication tower. For example, wireless device 740, located in the cell edge section of sector 716 may send a request for handover to join sector 718. As depicted, sector 718 has fewer wireless devices in its wireless network using the higher performance communication protocol than sector 716 and no wireless devices operating in the near vicinity to the location of wireless device 740.

If, at step 850, adjustment of an operating parameter is not possible and since the determination was made, at step 840, that the measured or calculated value associated with data throughput exceeds the threshold value, then, at step 880, the request by the wireless device (e.g., wireless device 750) to operate in the wireless network using the higher performance communication protocol (e.g., 5G) is not allowed or is denied. In some embodiments, the requesting wireless device may remain in the wireless using the lower performance communication protocol (e.g., 4G) or may request access to the wireless network using a different communication protocol. In some embodiments, depending on the location of the requesting wireless device with respect to adjacent cells or sectors of the wireless network, the new wireless device may request a handover to a different cell or sector in a manner similar to that described above.

After completion of an adjustment of the operating parameter of one or more antennas (e.g., antenna array for sector 716 in access node 710), at step 870, along with any changes that have taken place with operation of the wireless devices (e.g., wireless devices 720, 730, 740) in the wireless network as a result of the adjustment, process 800 returns to step 820 where new values associated with the number or count of wireless devices using the higher performance communication protocol in the wireless network are measured and/or calculated are made. It is important to note that iterations in process 800 may continue until the requesting wireless device (e.g., wireless device 750) is either allowed access using the higher performance communication protocol, at step 860, based on wireless devices ceasing operation using the higher performance communication protocol, or denied access using the higher performance communication protocol, at step 880, after no further adjustment to the operating parameter of one or more of the antennas is possible.

The elements of process 800 used to manage data throughput of wireless devices in the wireless network are intended to mitigate or eliminate the impact of the wireless devices to the wireless network, when these added devices request to join using a high performance communication protocol, such as 5G. The operation may further assure that some or all of the users of wireless devices 720, 730, and 740, as well as other devices currently in the wireless network, are not affected by network issues, such as QOS, latency of delivery, or buffering delay, associated with delivery of data and information for one or more services that may require use of the higher performance communication protocol provided over the wireless network.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for managing data throughput of wireless devices in a wireless network (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
  receiving a request from a wireless device to operate in a wireless network using a first communication protocol, the wireless network communicating with a plurality wireless devices using at least two communication protocols simultaneously;
  determining that a value associated with an aggregate data rate used by a set of the plurality of wireless devices using the first communication protocol in the wireless network exceeds a threshold value;
  adjusting an operating parameter of a multi-element antenna by reducing a number of antenna elements for communicating signals between an access node and the plurality of wireless devices in the wireless network using the first communication protocol when it is determined that the value exceeds the threshold value; and
  approving the request when, after adjustment of the operating parameter, at least one wireless device operating in the network ceases using the first communication protocol and the value no longer exceeds the threshold value.

2. The method of claim 1, wherein the set of wireless devices comprises all wireless devices using the first communication protocol in a selected region of the wireless network.

3. The method of claim 1, wherein the multi-element antenna is configured to operate in a multiple-input multiple-output (MIMO) operating mode in the wireless network.

4. The method of claim 1, wherein the multi-element antenna comprises a first portion having a first set of elements used for communicating on the wireless network using the first communication protocol.

5. The method of claim 4, wherein the first communication protocol is a fifth generation mobile networks or wireless systems protocol.

6. The method of claim 4, wherein adjusting the operating parameter of the multi-element antenna comprises reducing a number of elements in the first set of elements that are operating for at least of one of transmitting and receiving signals using the first communication protocol.

7. The method of claim 4, wherein the multi-element antenna further comprises a second portion having a second set of elements different from the first set of elements and used for communication on the wireless network using a second communication protocol.

8. The method of claim 7, wherein the wireless device has recently entered an area serviced by the access node in wireless network and wherein the wireless device initially requests access to the wireless network using the second communication protocol before making the request to operate in the wireless network using the first communication protocol.

9. The method of claim 1, further comprising denying the request by the wireless device to operate in the wireless network using the first communication protocol when it is determined that the value continues to exceed the threshold value.

10. The method of claim 1, wherein the adjusting the operating parameter of the multi-element antenna forces at least one of the wireless devices in the wireless network using the first communication protocol to cease operating in the wireless network using the first communication protocol.

11. The method of claim 1, wherein the determining the value associated aggregate data rate for the set of wireless devices in the wireless network using the first communication protocol further comprises determining a value for an aggregate data rate of all of the wireless devices communicating with the access node in the wireless network using the first communication protocol.

12. The method of claim 11, wherein the value associated with aggregate data rate for all of the wireless devices communicating with the access node in the wireless network using the first communication protocol comprises calculating the value over a period of time.

13. The method of claim 1, wherein the value associated with the aggregate data rate comprises a value for a radio downlink data rate between the access node and the set of wireless devices.

14. A system comprising:
  an access node, the access node including one or more multi-element antennas for communicating in a wireless network using at least two communication protocols; and a processing node coupled to the access node, the processing node receiving a request from a wireless device to operate in the wireless network using a first protocol of the at least two communication protocols, determining whether allowing the requesting wireless device to operate in the wireless network using the first communication protocol causes a value associated with an aggregate data rate for a set of wireless devices in the wireless network using the first communication protocol to exceed a threshold value, providing instructions to the access node to adjust an operating parameter of a multi-element antenna by reducing a number of antenna elements for communicating signals between the access node and a plurality of wireless devices in the wireless network using the first communication protocol when the value associated with the aggregate data rate for a set of wireless devices in the wireless network using the first communication protocol exceeds the threshold value, and approving the request from the wireless device when, after adjustment of the operating parameter, at least one wireless device operating in the network ceases using the first communication protocol and the value no longer exceeds the threshold value.

15. The system of claim 14, wherein the processing node further denies the request by the wireless device to operate in the wireless network using the first communication protocol when it is determined that the value continues to exceed the threshold value.

16. The system of claim 14, wherein the adjusting the operating parameter of the multi-element antenna forces at least one of the wireless devices in the wireless network using the first communication protocol to cease operating in the wireless network using the first communication protocol.

17. A processing node comprising:
a processor configured to:
receive a request from a wireless device for access to a wireless network communicating through an access node using a first communication protocol, the wireless network using at least two communication protocols simultaneously;
determine that a value associated with an aggregate data throughput for a set of wireless devices in the wireless network using the first communication protocol exceeds a threshold value;
provide instructions for adjusting an operating parameter of an antenna array in a access node by reducing a number of antenna elements for communicating signals in the wireless network using the first communication protocol when it is determined that the value associated with the aggregate data throughput for the set of wireless devices exceeds the threshold value; and
approve the request from the wireless device when, after adjustment of the operating parameter, at least one wireless device operating in the network ceases using the first communication protocol and the value no longer exceeds the threshold value.

18. The processing node of claim 17, wherein the determining that the value associated with the aggregate data throughput for the set of wireless devices in the wireless network using the first communication protocol further comprises determining a value for an aggregate data rate of all of the wireless devices communicating with the access node in the wireless network using the first communication protocol.

19. The processing node of claim 17, wherein the value associated with the aggregate data throughput comprises a value for the radio downlink data throughput between the access node and the set of wireless devices.

* * * * *